United States Patent
Pientka

[11] Patent Number: 5,838,454
[45] Date of Patent: Nov. 17, 1998

[54] SENSOR ARRANGEMENT FOR DETECTING THE DEGREE OF WETTING OF A WINDSHIELD

[75] Inventor: Rainer Pientka, Achern, Germany

[73] Assignee: Robert Bosch GmbH, Stuttgart, Germany

[21] Appl. No.: 784,134

[22] Filed: Jan. 15, 1997

[30] Foreign Application Priority Data

Jan. 19, 1996 [DE] Germany ............... 196 01 802.1

[51] Int. Cl.$^6$ .................... G01N 21/88; B60S 1/02
[52] U.S. Cl. ............. 356/445; 250/227.25; 318/DIG. 2
[58] Field of Search .................. 356/445; 250/227.24, 250/227.25; 318/DIG. 2

[56] References Cited

U.S. PATENT DOCUMENTS

| | | | |
|---|---|---|---|
| 4,093,384 | 6/1978 | Ferguson | 356/416 |
| 4,652,745 | 3/1987 | Zanardelli | 250/577 |
| 4,676,638 | 6/1987 | Yasuda | 250/573 X |
| 4,701,613 | 10/1987 | Watanabe et al. | 250/227.24 |

FOREIGN PATENT DOCUMENTS

| | | |
|---|---|---|
| 0655619 | 5/1995 | European Pat. Off. . |
| 3203091 | 8/1983 | Germany . |
| 43 30 710 C | 11/1994 | Germany . |
| 4406398 | 8/1995 | Germany . |
| 44 10 217 A | 9/1995 | Germany . |

Primary Examiner—Vincent P. McGraw
Attorney, Agent, or Firm—Spencer & Frank

[57] ABSTRACT

A sensor device for detecting a wetting condition on a windshield where radiation emitted by a radiation transmitter is coupled with the windshield by a coupling element with a beam acceptance surface designed as focusing lens and where, following at least one total reflection from the windshield via a decoupling element which has a beam emission surface that is also a focusing lens. The radiation is decoupled to a radiation receiver and the axial transmitter radiation is totally reflected on a level first limiting surface, and the radiation acceptance surface has a spherical shape. The radiation transmitter is arranged such that the diverging transmitter radiation is essentially focused axis-parallel toward the first limiting surface and that the dimensions of the first limiting surface are at least big enough so that it detects the complete parallel-focused beam of rays.

9 Claims, 1 Drawing Sheet

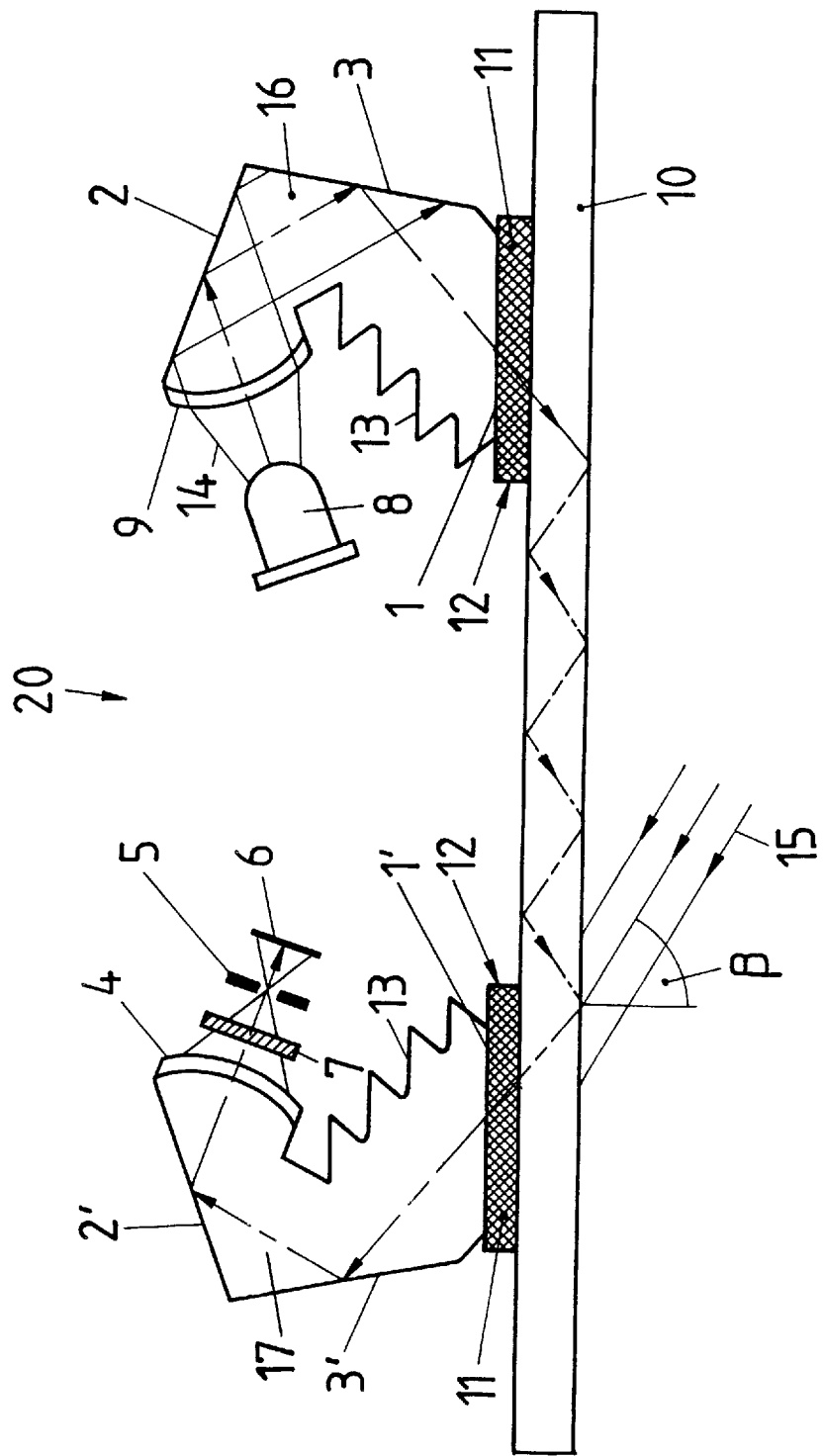

SENSOR ARRANGEMENT FOR DETECTING THE DEGREE OF WETTING OF A WINDSHIELD

CROSS-REFERENCE TO RELATED APPLICATION

This application claims the priority of Patent Application Serial No. 1 96 01 802.1-52, filed in Germany on Jan. 19, 1996, the subject matter of which is incorporated herein by reference.

BACKGROUND OF THE INVENTION

The present invention relates to a sensor device for detecting the degree of wetting of a windshield, for which a radiation emitted by a radiation transmitter is coupled with the windshield via a coupling element with a beam acceptance surface designed as a focusing lens, and is decoupled onto a radiation receiver via a decoupling element, which has a beam discharge surface that is also designed as a focusing lens, following at least one total reflection from the windshield, wherein the axial transmitter radiation is reflected totally on a flat, first limiting surface in the coupling element.

A sensor device of this type is shown in DE 44 06 398 A1 which is used, for example, for an automatic wiper control of a motor vehicle. In that sensor device, radiation emitted by a radiation transmitter is coupled via a beam guide element on the transmitter side, which is designed as coupling element, with a windshield in such a way that it is reflected totally at least once and is then guided via a beam guide element on the receiver side, which serves as a decoupling element, to a radiation receiver that emits an electric signal corresponding to the received radiation. If the side of the windshield facing away from the beam guide elements is wetted, such as rain, snow or dirt, radiation is blocked from the windshield by this wetting, so that the amount of radiation that reaches the radiation receiver is reduced correspondingly. It is through this reduction in the amount of radiation that the wetting condition is detected in a downstream evaluation unit, which results in the triggering of a suitable reaction. DE 44 06 398 A1 shows ways of suppressing or shielding extraneous light, which can be superimposed as interference on the received transmitter radiation. For example, there is specified how the various limiting surfaces for the beam guide elements can be directed favorably to separate the extraneous light from the transmitter radiation. Despite these measures, interferences can be superimposed on the received transmitter radiation, which make it more difficult to draw definite conclusions concerning a respective wetting events.

An electronic clocking of the transmitter radiation for compensating the interfering extraneous radiation is shown in DE 32 03 091 A1. For a better coupling of the beam guide elements and the windshield, the suggestion is made to install a silicone window in this transition range.

It is the object of the invention to provide a sensor device of the aforementioned type, for which interferences in the received transmitter radiation are suppressed further.

SUMMARY OF THE INVENTION

This object and others are achieved by a sensor device for detecting a wetting condition on a windshield where radiation emitted by a radiation transmitter is coupled with the windshield by a coupling element with a beam acceptance surface designed as focusing lens and where, following at least one total reflection from the windshield the radiation is decoupled to a radiation receiver via a decoupling element which has a beam emission surface that is also designed as focusing lens. The axial transmitter radiation is totally reflected on a flat first limiting surface in the coupling element and, the radiation acceptance surface has a spherical shape. The radiation transmitter is arranged such that the diverging transmitter radiation is essentially focused axis-parallel toward the first limiting surface and the dimensions of the first limiting surface are at least big enough so that it detects the complete parallel-focused beam of rays.

By focusing the transmitter radiation parallel to the axis and through the adapted limiting surface, a defined beam of rays is generated, which beam can be conducted further and defined via the coupling element and the decoupling element to the radiation receiver. This almost completely rules out interferences in the transmitter radiation caused by varied incidence on the limiting surfaces or dispersion along edges or other places of transition. On the one hand, the amount of radiation from the transmitter is guided with minimal loss to the radiation receiver with the aid of these measures. On the other hand, this defined beam guidance permits extraneous light which normally enters the decoupling element at a different angle, to be separated out clearly with the aid of additional measures as specified, for example, in the DE 44 06 398 A1. The signal-to-noise ratio is optimized with the features according to the invention.

According to a further feature of the present invention, there is a second limiting surface adjoining the first limiting surface in the beam, with this second limiting surface being aligned such that the transmitter radiation reflected at the first limiting surface is totally reflected, which second limiting surface is dimensioned at least big enough so that the transmitter radiation reflected at the first limiting surface is received completely, further contributing to feeding the transmitter radiation to the radiation receiver as completely as possible and without interference, so that a reliable analysis is ensured.

According to another advantageous feature of the present invention, the sensor devices of the coupling and decoupling elements have the same design, thus facilitating the manufacture of equipment.

In order to have as much of the transmitter radiation as possible coupled with the windshield or decoupled from it and without dispersions, it is advantageous to provide an elastic medium between a transition surface for the coupling element to the windshield and/or another transition surface of the windshield to the decoupling element, which elastic medium has narrow edges and is transparent to the transmitter radiation. The narrow edges are bordered with a light shade and/or are coated with a radiation-absorbing material. A silicon window is particularly suitable to serve as the transparent medium.

BRIEF DESCRIPTION OF THE DRAWINGS

These and other features and advantages of the invention will be further understood from the following detailed description of the preferred embodiments with reference to the accompanying drawings in which the single FIGURE shows a sensor according to the present invention.

DETAILED DESCRIPTION OF THE PREFERRED EMBODIMENTS

Referring now to the drawings, the FIGURE shows a sensor device 20 coupled with a windshield 10, which has a beam guide element on the transmitter side in the form of a coupling element 16 and a beam guide element on the receiver side in the form of a decoupling element 17. The sensor device 20 is housed in a non-depicted casing (not shown).

A radiation transmitter 8 transmits radiation 14 via a radiation acceptance surface 9 to a coupling element 16. The transmitter radiation 14 is totally reflected on a first limiting surface 2 of the coupling element 16 and is guided to a second limiting surface 3 of the coupling element 16, where another total reflection occurs. From the second limiting surface 3, the transmitter radiation 14 is coupled with the windshield 10 via a transitional surface 1 and a transitional layer 11 which is at such an angle that on the side of windshield 10 that is opposite the sensor device 20, there occurs a total reflection if the windshield 10 is not wetted, which reflection is presently repeated several times within the windshield 10, until it reaches the decoupling element 17 that is installed at a distance to the coupling element 16. At decoupling element 17, the transmitting radiation 14 enters this decoupling element 17 via another transitional layer 11 and another transition surface 1' and is initially reflected totally at a second limiting surface 3' of the decoupling element 17 and then at a first limiting surface 2' of the decoupling element 17 and is then focused toward a radiation receiver 6 via a beam emission surface 4. In the arrangement according to the present invention, an optical filter 7 and a light shade 5 are arranged between the beam emission surface 4 and the radiation receiver 6. To suppress interference radiation, the inside 13 of the coupling element 16 and the decoupling element 17 have a sawtooth shape, so as to eliminate radiation components that fall onto the inside 13.

Under unfavorable conditions, extraneous light 15 striking the side of windshield 10 that faces away from the sensor unit 20, for example at an angle β, enters the windshield 10 and decoupling element 17. The first and second limiting surfaces 2', 3' are aligned such that the extraneous light does not strike at the total reflection angle and thus exits almost completely from the decoupling element 17, as described in the aforementioned DE 44 06 398 A1.

In the case at hand, the point is to guide the transmitter radiation 14 as defined as possible to the radiation receiver 6, so that wetting of the windshield 10 can be detected reliably by a subsequently following evaluation unit (not shown). To this end, the beam acceptance surface 9 has a spherical shape and the radiation transmitter 8 is arranged such that diverging beams of rays emitted by it are detected as completely as possible and all rays are essentially aligned parallel to the optical axis. The radius of curvature for the spherical radiation acceptance surface 9 in this case is also adjusted to detect the beam of rays as completely as possible. The dimensions for the first limiting surface 2 are big enough so that the beam of parallel rays is received completely by it and is focused toward the second limiting surface 3, the dimensions of which are also adapted to a complete reception of the beam of rays. The rays along the edge of the beam are therefore conducted under total reflection into the coupling element 16 just as securely and as defined as the axial beam. Also, coupling with the windshield 10 is defined the same way for all rays of the transmitter radiation 14. Corresponding conditions exist for the identically designed decoupling element 17. As a result of the defined guidance of any portion of the transmitter radiation, the design and arrangement of the individual components of the sensor unit 20, in connection with the windshield 10, can be adapted exactly to the transmitter radiation 14, so that as to optimize the radiation yield and to suppress, for the most part, the influence of the interferences.

Dispersions at the two transitional layers 11 can occur especially along the edges 12 of the two transitional layers 11, wherein the extraneous light that hits these edges can also have an effect there. To eliminate such interference radiation as well, the edge 12 is provided with a radiation absorbing layer, such as a black tinting for visible light. Alternatively or in addition, the edges 12 can also be bordered or provided with a mechanical light shade. These measures make it possible to avoid with certainty undefined scattered rays.

Thanks to the above features, the transmitter radiation 14 is transmitted to the radiation receiver 6 with minimum losses and an optimization of the signal-to-noise ratio. These measures increase the reliability during the detection of anything that causes the windshield to be wetted.

It will be understood that the above description of the present invention is susceptible to various modifications, changes and adaptations, and the same are intended to be comprehended within the meaning and range of equivalents of the appended claims.

What is claimed is:

1. A sensor device for detecting a wetting condition on a windshield wherein: radiation emitted by a radiation transmitter is coupled with the windshield by a coupling element with a beam acceptance surface designed as a focusing lens and where, following at least one total reflection from the windshield, the radiation is decoupled to a radiation receiver via a decoupling element, which has a beam emission surface that is also a focusing lens, the axial transmitter radiation is totally reflected on a flat first limiting surface of the coupling element, said beam acceptance surface has a spherical shape, said radiation transmitter is arranged such that diverging transmitter radiation is essentially focused axis-parallel toward the first limiting surface by the beam acceptance surface, and the dimensions of the first limiting surface are at least big enough so that it receives the complete parallel-focused beam of rays.

2. A sensor device according to claim 1, further comprising a second limiting surface which follows said first limiting surface in said coupling element, which is aligned such that the transmitter radiation reflected at said first limiting surface is totally reflected at said second limiting surface, and which has dimensions at least big enough so that the transmitter radiation reflected on said first limiting surface is received completely.

3. A sensor device according to claim 1, wherein said coupling element and said decoupling element have the same design.

4. A sensor device according to claim 1, further comprising an elastic medium with narrow edges, said elastic medium being transparent to the transmitter radiation and being arranged between at least one of a transition surface of said coupling element and the windshield, and another transition surface of said decoupling element and the windshield, said narrow edges being bordered by a light shade.

5. A sensor device according to claim 4, wherein said transparent medium is a silicon window.

6. A sensor device according to claim 1, further comprising an elastic medium with narrow edges, said elastic medium being transparent to the transmitter radiation and being arranged between at least one of a transition surface of said coupling element and the windshield, and another transition surface of said decoupling element and the windshield, said narrow edges having a radiation-absorbent layer.

7. A sensor according to claim 6, wherein said transparent medium is a silicon window.

8. A sensor device according to claim 1, further comprising an elastic medium with narrow edges, said elastic medium being transparent to the transmitter radiation and being arranged between at least one of a transition surface of said coupling element and the windshield, and another transition surface of said decoupling element and the windshield, said narrow edges being bordered by a light shade and having a radiation-absorbent layer.

9. A sensor according to claim 8, wherein said transparent medium is a silicon window.

\* \* \* \* \*